United States Patent [19]
Yoshida et al.

[11] Patent Number: 6,104,477
[45] Date of Patent: Aug. 15, 2000

[54] OPTICAL CHARACTERISTIC MEASUREMENT SYSTEM

[75] Inventors: Masanori Yoshida; Seiji Watanabe, both of Tokyo, Japan

[73] Assignee: NEC Corporation, Tokyo, Japan

[21] Appl. No.: 09/219,612

[22] Filed: Dec. 23, 1998

[30] Foreign Application Priority Data

Dec. 25, 1997 [JP] Japan .................................. 9-366152

[51] Int. Cl.⁷ .................................................. G01N 21/00
[52] U.S. Cl. .............................................. 356/73; 359/124
[58] Field of Search .................................. 356/73; 385/1, 385/5, 11, 24, 36, 42, 122; 359/124, 133, 182, 161, 181, 134

[56] References Cited

U.S. PATENT DOCUMENTS

| | | | |
|---|---|---|---|
| 4,923,290 | 5/1990 | Brinkmeyer et al. | 350/377 |
| 5,896,211 | 4/1999 | Watanabe | 359/124 |
| 5,970,201 | 10/1999 | Anthony et al. | 385/140 |

FOREIGN PATENT DOCUMENTS

| | | |
|---|---|---|
| 57-120835 | 7/1982 | Japan . |
| 9-186655 | 7/1997 | Japan . |
| 9-214035 | 8/1997 | Japan . |

*Primary Examiner*—Robert H. Kim
*Assistant Examiner*—Tu T. Nguyen
*Attorney, Agent, or Firm*—Ostrolenk, Faber, Gerb & Soffen, LLP

[57] ABSTRACT

An optical characteristic measurement system which can measure optical characteristics of an optical device precisely and stably without being affected by the polarization-dependent loss of optical components in the optical characteristic measurement system. The optical characteristic measurement system includes a multi-wave optical source for generating a signal light of linear polarization having a plurality of wavelengths each different from each other, a polarization scrambler for scrambling the polarization direction of the signal light to be supplied to a device under test, and an average power measurement unit for measuring an average power of the signal light outputted from the device under test, for each of the wavelengths.

10 Claims, 6 Drawing Sheets

OPTICAL CHARACTERISTIC MEASUREMENT SYSTEM

BACKGROUND OF THE INVENTION

The present invention relates to an optical characteristic measurement system, and more particularly to that which can measure an optical characteristic of an optical device precisely by eliminating effect of the polarization-dependent loss of the optical path of the measurement system.

As represented by the optical communication system, application of optical energy, having excellent linearity and ease of propagation, to information transmission technology and information processing technology is now studied earnestly, and WDM (Wavelenth-Division-Multiplex) transmission is considered to be a main current of high-capacity communication media in the near future.

The WDM transmission is a technology for transmitting a lot of information by way of a single fiber by superimposing a plurality of carrier waves having different wavelengths modulated with different base-band signals. The superimposed carrier waves can be considered to be a base-band signal whereby a still higher frequency carrier wave is to be modulated and further superimposed into another multi-frequency optical wave.

FIG. 7 is a spectrum chart schematically illustrating a concept of the WDM signal, wherein optical power values are represented by a longitudinal axis and wave lengths are represented by a transversal axis. Around carrier waves 2, 3 and 4 having respective central wavelengths $\lambda_1$, $\lambda_2$, and $\lambda_3$, spectrum bands 5, 6 and 7 are spread occupying bandwidths corresponding to bandwidths of respective base-band signals.

The optical fiber used for optical communication has a far wider bandwidth compared to an electrical cable and can transmit as many carrier waves as the bandwidth permits. Here, it is necessary for correctly reproducing base-band signals that each of the spectrum bands 5, 6 and 7 is not overlapped with each other. However, the spectrum bands are inevitably spread wider than necessary because of bandwidth characteristics of optical devices, such as a modulator/demodulator used in the optical transceivers, and hence, the wide bandwidth of the optical fiber cannot be used fully.

Therefore, performance of an optical communication system can be said to depend greatly on the optical characteristics of the optical devices used in the communication system, and it is very important to precisely evaluate the optical characteristics of the optical devices.

FIG. 8 is a block diagram illustrating a configuration of a conventional optical characteristic measurement system.

The conventional optical characteristic measurement system of FIG. 8 has a multi-wave optical source comprising distributed-feedback laser diodes (hereinafter abbreviated as the DFB-LDs) $10_1$ to $10_8$ each generating a signal light of a wavelength different from each other, optical switches $11_1$ to $11_8$ each provided for switching ON/OFF the output light of a respective one of the DFB-LDs $10_1$ to $10_8$, and an optical coupler 12 functioning as an optical synthesizer for synthesizing the light output from of the optical switches $11_1$ to $11_8$.

The multi-wave optical source generates a signal light having one or more desired wavelengths different from each other, by synthesizing signal lights selected by the optical switches $11_1$ to $11_8$ from among the signal lights outputted from the DFB-LDs $10_1$ to $10_8$ using the optical coupler 12.

The signal light synthesized by the optical coupler 12 is inputted to an optical attenuator 14 after being amplified by an erbium-doped optical-fiber amplifier (EDFA) 13 working as an optical direct amplifier. The optical attenuator 14 is provided for adjusting the light intensity of the signal light, which is performed by controlling the attenuation factor of the optical attenuator 12 with reference to the power value measured by a first optical power meter $16_1$ to which is inputted a part of the signal light splitted from a first optical coupler 15 functioning as an optical branch.

The first optical power meter $16_1$ measures a power value of the signal light inputted thereto, and the measured value indicates an integral of the power values of each spectrum band when the signal light is a WDM signal such as illustrated in FIG. 7.

The other part of the signal light outputted from the optical attenuator 14 and splitted by the first optical coupler 15 is inputted to a first optical isolator 17, which is provided for suppressing optical noises leaking from the input terminal of an optical component to be connected to the output terminal of the first optical isolator 17, so that the optical noises do not reach the multi-wave optical source. The output light of the first optical isolator 17 is inputted to a first optical switch 18.

The first optical switch 18 switches the optical path of its input light. Here, the first optical switch 18 selects either an optical path connected to a second optical switch 20 passing through a DUT (Device Under Test) 19, that is, an optical device to be measured, or an optical path directly connected to the second optical switch 20.

The signal light arriving at the second optical switch 20 through either one of the two paths is inputted to a second optical isolator 21, which is inserted for suppressing optical noises leaking from an input terminal of a second optical coupler 22 connected to the output terminal of the second optical isolator 21, so that the optical noises do not spread toward the optical source side.

The signal light inputted to the second optical coupler 22, functioning as an optical branch, is split and inputted to an optical spectrum analyzer 23 and to a second optical power meter $16_2$, to be measured respectively.

The second optical power meter $16_2$ measures a power value of the signal light inputted thereto, and the measured value indicates an integral of the power values of each spectrum band when the signal light is a WDM signal such as illustrated in FIG. 7, in the same way as with the first optical power meter $16_1$. The optical spectrum analyzer 23 divides the inputted signal light into frequency components and measures a power value of each of the frequency components.

Since optical devices of the WDM communication system should have sufficient performance in every frequency band used in the WDM communication system, it is very important to evaluate the optical characteristics of the optical devices for each frequency component using the optical spectrum analyzer 23.

In the conventional optical characteristic measurement system having such a configuration as above described, the optical characteristic of the DUT 19 is evaluated according to the difference between the optical powers of the signal light measured passing through the DUT 19 and the signal light not passing through the DUT 19, when the optical characteristics of an optical amplifier is measured as the DUT 19, for example.

However, the optical components in the optical characteristic measurement system have inevitably their own polarization-dependent losses, that is, transmission losses of the optical power varying according to change of polarization direction of the transmission light.

FIG. 9 is a graphic chart schematically illustrating a variation of optical power due to polarization-dependent loss in the measurement system, wherein a measured value 26 of the optical power of a signal light, having a proper power level 25, changes within a variation range 27, according to the polarization variation of the signal light.

The polarization variation may be represented by a function of time. Therefore, the measured value 26 may be said to change within the variation range 27 according to time, which means different power values may be obtained from the same signal light when it is measured at different time points, resulting in a measurement error caused by the variation of the measured value due to the polarization-dependent losses of the optical components in the measurement system.

This measurement error due to the polarization-dependent loss is also inevitable even when the signal light is measured using the optical spectrum analyzer which can measure the optical power for each frequency component.

As described above, optical characteristics of an optical device can not be measured with sufficient precision using the conventional measurement system because of the polarization-dependent loss, and the measurement results obtained without consideration of the polarization-dependent loss are also not been stable.

As to the optical transmission system, there have been proposed some techniques for reducing the effect of polarization-dependent loss by scrambling the polarization direction of the transmission light, an example of which is disclosed in a Japanese patent application laid open as Provisional Publication No. 09-186655.

However, only by reducing the effect of the polarization-dependent loss from the transmission signal, the high-capacity and high-performance WDM communication system of the future cannot be realized. As described above, optical characteristics of each optical device of the WDM communication system should be precisely and stably evaluated for each wavelength, or frequency component. Therefore, it is essential to provide an optical characteristic measurement system which can measure optical characteristics of an optical device for each wavelength, making use of a measurement device such as the optical spectrum analyzer, precisely and stably without being affected by polarization-dependent loss.

SUMMARY OF THE INVENTION

Therefore, a primary object of the present invention is to provide an optical characteristic measurement system which can measure optical characteristics of an optical device precisely and stably without being affected by polarization-dependent loss in optical components in the optical characteristic measurement system.

Another object of the invention is to provide an optical characteristic measurement system which can obtain high-precision measurement results, even when an optical spectrum analyzer is used as the measurement device.

In order to achieve these objects, an optical characteristic measurement system according to the invention comprises:

a multi-wave optical source for generating a signal light of linear polarization having a plurality of wavelengths each different from each other;

a polarization scrambler for scrambling the polarization direction of the signal light to be supplied to an device under test; and an average power measurement means for measuring an average power of the signal light outputted from the device under test, for each of the wavelengths.

Therefore, by scrambling the polarization direction of the signal light at random and measuring the average power of the signal light to be inputted into and outputted from the device under test, optical characteristics of the device under test can be measured precisely and stably without being affected by polarization-dependent loss accompanying the optical components of the measurement system.

More preferably, the average power measurement means comprises:

an optical attenuator for controlling the intensity of the signal light;

a monitoring means for indicating a monitor value which varies in proportion to a power of the signal light to be supplied to the device under test;

a switching means for controlling whether the signal light to be supplied to the device under test is outputted passing through the device under test or outputted directly without passing through the device under test;

an output power measurement means for obtaining measurement values of a power of the signal light outputted from the switching means for each of the wavelengths;

an average calculation means for calculating an average power by taking a time average of the measurement values obtained by the output power measurement means; and a control means for calculating an input calibration value indicating a difference between a power actually supplied to the device under test and the average power to be obtained by measuring a power of the signal light supplied to the device under test, and an output calibration value indicating a difference between a power actually outputted from the device under test and the average power to be obtained by measuring a power of the signal light outputted from the device under test, by controlling the optical attenuator and the switching means and making use of the monitoring means and a dummy device to be set in place of the device under test, and measuring optical characteristics of the device under test from an input power value which is calculated by subtracting the input calibration value from the average value obtained by measuring a power of the signal light supplied to the device under test and an output power value which is calculated by subtracting the output calibration value from the average value obtained by measuring a power of the light signal outputted from the device under test.

Therefore, more precise and stable measurement results can be obtained even when an optical spectrum analyzer is used as the output power measurement means, by appropriately calibrating measurement results of the signal power supplied to the device under test and the signal power outputted from the device under test.

The multi-wave optical source can be realized with:

an optical coupler for outputting the signal light by coupling the signal light inputted to the optical coupler;

a plurality of distributed-feedback laser diodes each generating linear polarization light having a wavelength different from each other; and optical switches each controlling or not to input the linear polarization light generated from a respective one of the distributed-feedback laser diodes into the optical switch.

Tunable wavelength sources may be employed in place of the distributed-feedback laser diodes, or an arrayed waveguide grating may be employed as the optical coupler.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or corresponding parts.

In the drawings.

DETAILED DESCRIPTION OF THE PREFERRED EMBODIMENTS

Now, embodiments of the present invention will be described in connection with the drawings.

Figure 1:
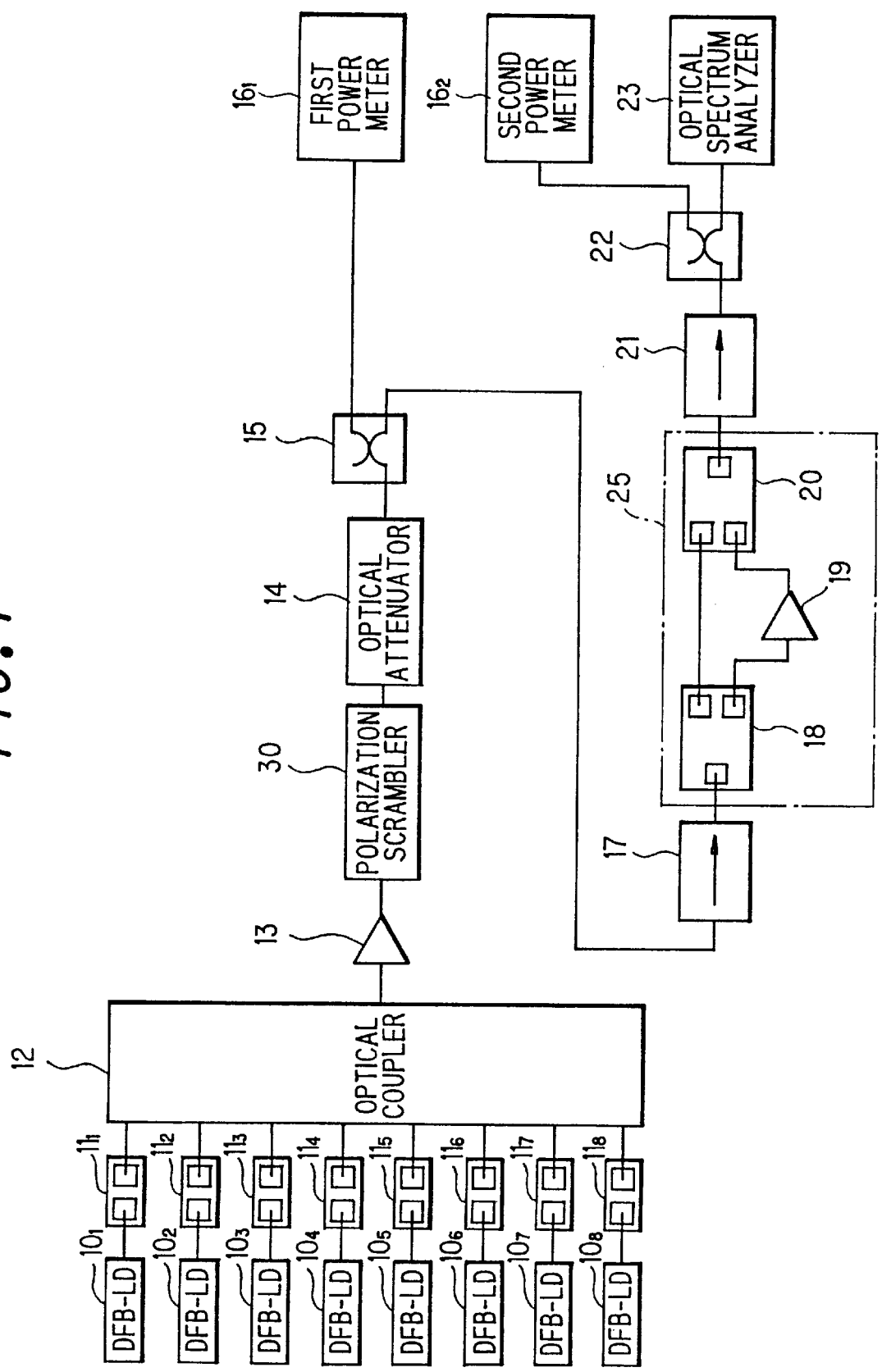
FIG. 1 is a block diagram illustrating a configuration of an optical characteristic measurement system according to an embodiment of the invention.

FIG. 1 is a block diagram illustrating a configuration of an optical characteristic measurement system according to an embodiment of the invention.

The optical characteristic measurement system of FIG. 1 has a multi-wave optical source comprising DFB-LDs $10_1$ to $10_8$ each generating a signal light of linear polarization having a wavelength different from each other, optical switches $11_1$ to $11_8$ each provided for switching ON/OFF the output light of a respective one of the DFB-LDs $10_1$ to $10_8$, and an optical coupler 12 functioning as an optical synthesizer for synthesizing the output lights from the optical switches $11_1$ to $11_8$.

Figure 8:
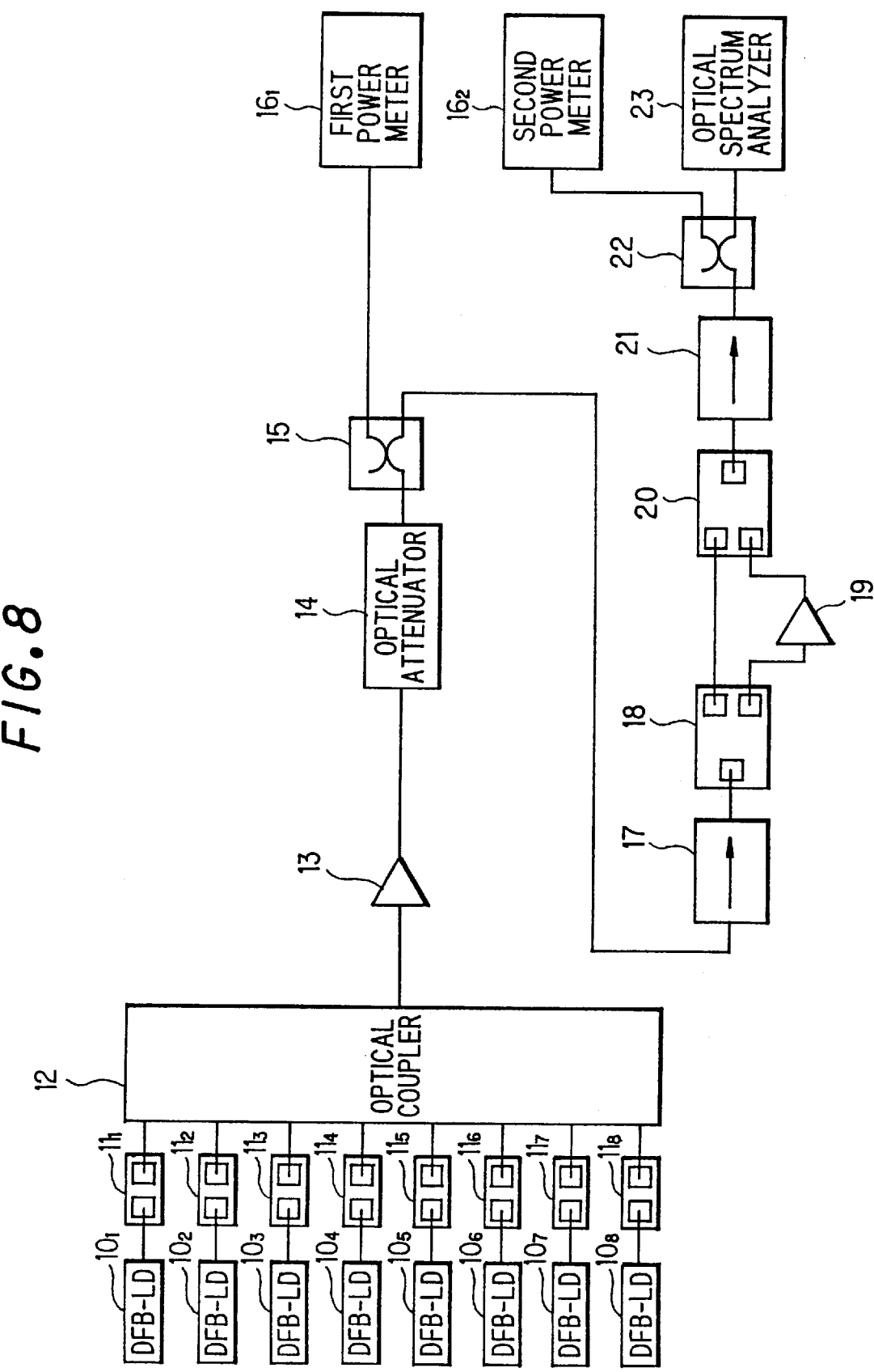
FIG. 8 is a block diagram illustrating a configuration of a conventional optical characteristic measurement system.
Figure 9:
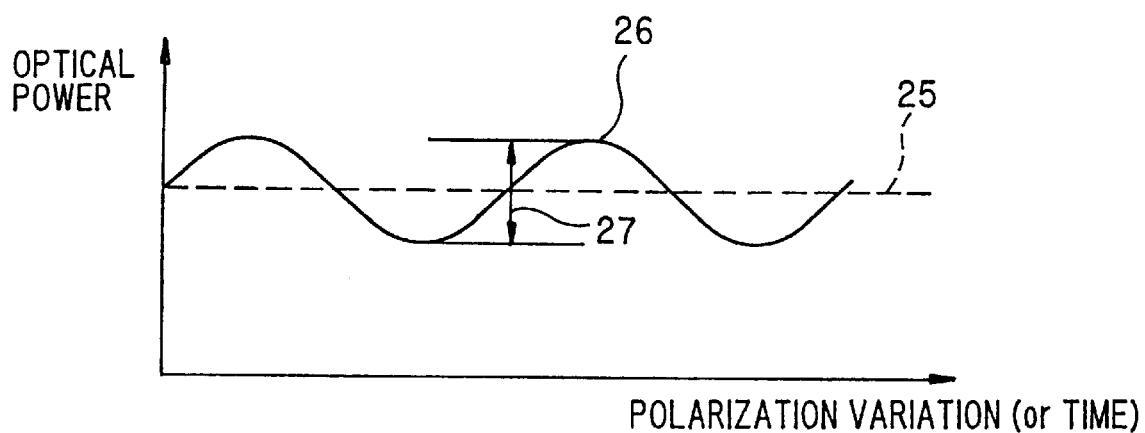
FIG. 9 is a graphic chart illustrating a variation in optical power due to polarization-dependent loss in an optical component.

The multi-wave optical source generates a signal light of linear polarization having one or more desired wavelengths different from each other, by synthesizing the signal lights selected by the optical switches $11_1$ to $11_8$ among signal lights outputted from the DFB-LDs $10_1$ to $10_8$ using the optical coupler 12, in the same way as with the conventional system of FIG. 8.

In the embodiment of FIG. 1, the signal light synthesized by the optical coupler 12 is inputted to a polarization scrambler 30 after being amplified by an optical amplifier 13 such as an EDFA. The polarization scrambler the 30 scrambles polarization direction of the signal light inputted thereto, that is, changes the polarization direction at random. The signal light outputted from the polarization scrambler 30 is inputted to an optical attenuator 14.

The optical attenuator 14 is provided for adjusting the light intensity of the signal light, which is performed by controlling the attenuation factor of the optical attenuator 12 with reference to the power value measured by a first optical power meter $16_1$ to which is inputted a part of the signal light splitted from a first optical coupler 15 functioning as an optical branch. More fine intensity control may be achieved by adjusting both the optical amplifier 13 and the optical attenuator 14 in cooperation with each other.

Figure 7:
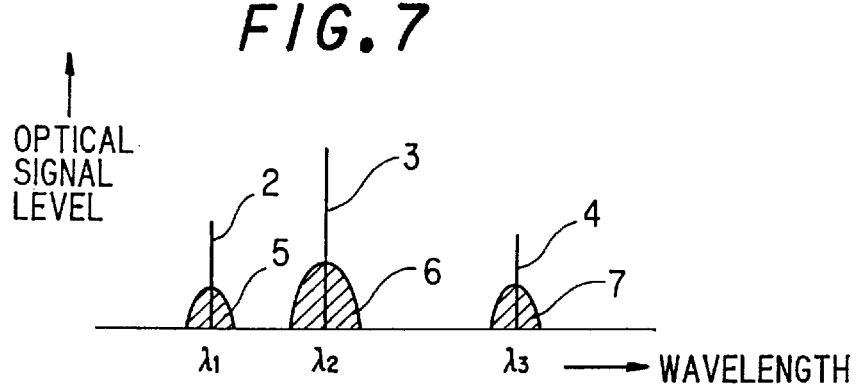
FIG. 7 is a spectrum chart schematically illustrating a concept of the WDM signal.

The first optical power meter $16_1$ measures a power value of a signal light inputted thereto, and the measured value indicates an integral of the power values of each spectrum band when the signal light is a WDM signal such as illustrated in FIG. 7.

The other part of the signal light outputted from the optical attenuator 14 and splitted by the first optical coupler 15 is inputted to a first optical isolator 17, which is provided for suppressing optical noises leaking from the input terminal of an optical component to be connected to the output terminal of the first optical isolator 17, so that the optical noises do not reach the multi-wave optical source. The output light of the first optical isolator 17 is inputted to a first optical switch 18 of a switching means 25.

The first optical switch 18 the optical path of its input light. Here, the first optical switch 18 selects either an optical path connected to a second optical switch 20 after first passing through a DUT 19, or an optical path directly connected to the second optical switch 20.

The signal light arriving at the second optical switch 20 through either one of the two paths is inputted to a second optical isolator 21, which is inserted for suppressing optical noises leaking from the input terminal of a second optical isolator 21, so that the optical noises do not spread toward the optical source side.

The signal light inputted to the second optical coupler 22, functioning as an optical branch, is split and inputted to an optical spectrum analyzer 23 and to a second optical power meter $16_2$, to be measured respectively.

The second optical power meter $16_2$ measures a power value of a signal light inputted thereto, and the measured value indicates an integral of the power values of each spectrum band when the signal light is a WDM signal such as illustrated in FIG. 7. The optical spectrum analyzer 23 divides the inputted signal light into frequency components and measures a power value of each of the frequency components.

In the following paragraphs, the power variation of the signal light in which the polarization direction is scrambled by the polarization scrambler 30 and its effects will be described.

Figure 2:
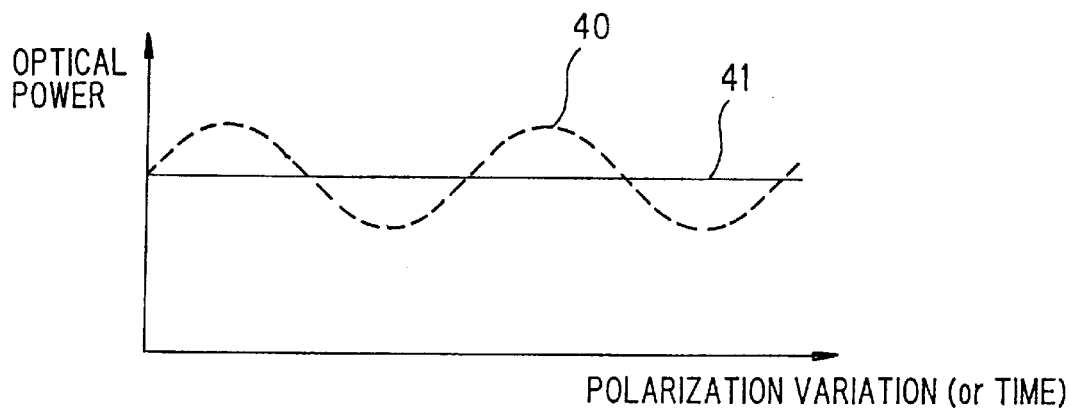
FIG. 2 is a graphic chart schematically illustrating a variation of an optical power 40 processed with the polarization scrambler 30 of FIG. 1.

FIG. 2 is a graphic chart schematically illustrating the variation of an optical power 40 of a signal light originally having a power level 41, processed with the polarization scrambler 30 and measured after passing through an optical path having polarization-dependent loss. As shown in FIG. 2, the measured value of the optical power 40 changes according to the polarization direction varying along with time passage. Therefore, a power value measured at a specific time point includes a measurement error due to the polarization-dependent loss.

However, the variation of the polarization direction of the signal light after passing through the polarization scrambler 30 can be regarded as quasi-cyclic and the variation cycle can be made sufficiently short by controlling the polarization scrambler 30. Therefore, when an average of the measured value is taken for a sufficient number of the variation cycles, the original power level 41 can be precisely and stably represented as the average of the measured value.

In the embodiment of FIG. 1, by thus scrambling the polarization direction of the signal light using the polarization scrambler 30, and taking a time average (using an average calculating means not depicted in the drawings) of the measurement results obtained from the spectrum analyzer 23, a stable and precise measurement of the optical characteristic is realized.

Now, a procedure for obtaining the stable and precise measurement result using the optical characteristic measurement system of FIG. 1 will be described with reference to a case where the gain characteristic of an optical amplifier is measured, by way of example.

Figure 3:
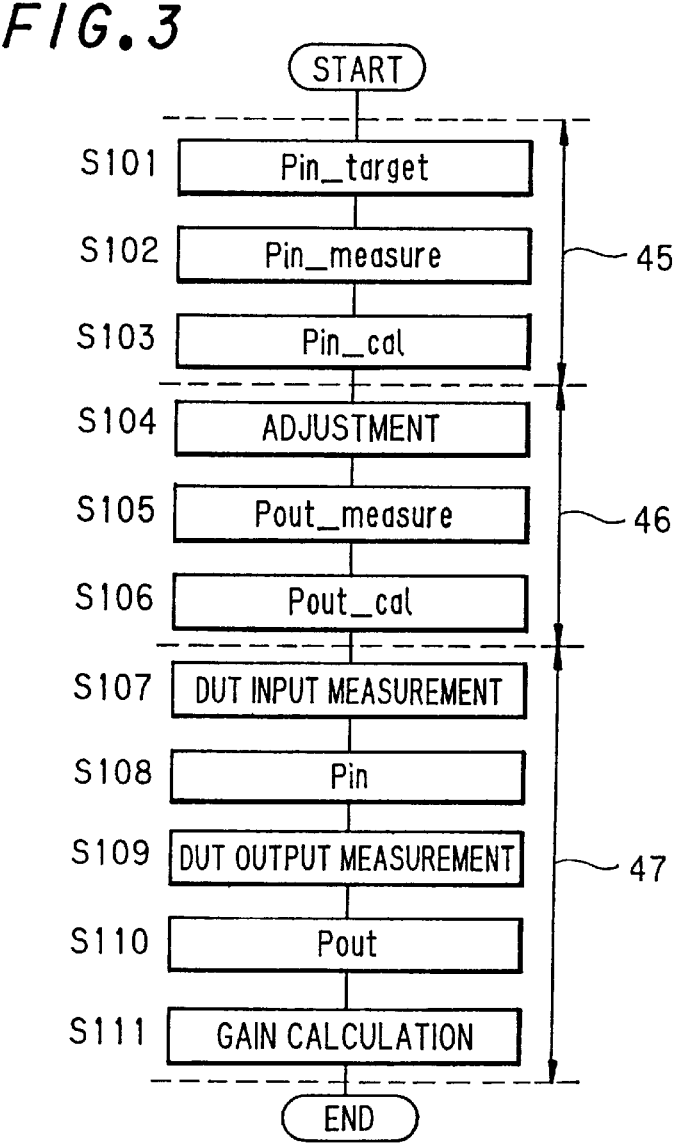
FIG. 3 is a flowchart illustrating an outline of a procedure for obtaining a measurement result using the optical characteristic measurement system of FIG. 1.

FIG. 3 is a flowchart illustrating an outline of the procedure.

First, setting of a target input power Pin_target, that is, a desired power value of a test signal light to be inputted to the DUT 19, is performed (at step S101). To set this value, an optical power meter is provided in place of the DUT 19. Then, turning the first optical switch 18 to the DUT side, the attenuation factor of the optical attenuator 14 is adjusted so that the optical power meter shows a target, or a desired input power Pin_target, and a monitor value Pin_monitor, which is the indication of the first optical power meter $16_1$, giving the target input power Pin_target is memorized.

Then, turning the first optical switch 18 to the direct side (to select the optical path not passing through the DUT 19), a measurement input power Pin_measure is measured (at step S102). The measurement input power Pin_measure is the averaged indication of the spectrum analyzer 23 obtained by turning the first optical switch 18 to the direct side on a condition that the attenuation factor of the attenuator 14 is so adjusted as to give the target input power Pin_target.

Then, an input calibration value Pin_cal is calculated (at step S103) from the target input power Pin_target and the measurement input power Pin_measure thus obtained, as Pin_cal=Pin_measure−Pin_target.

The steps S101 to S103 comprise an input calibration value measuring step 45, and the input calibration value measuring step 45 is performed for each of the desired values of the target input power Pin_target.

The input calibration value measurement step 45 is followed by an output calibration value measurement step 46.

Figure 5:
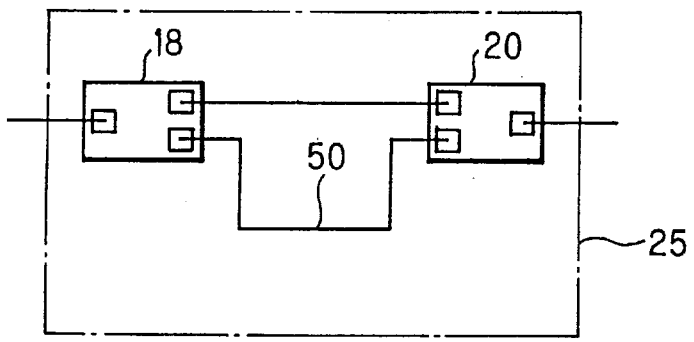
FIG. 5 is a block diagram illustrating the switching means 25 wherein DUT side terminals of the first and the second optical switched are connected directly by way of a dummy device.

In the output calibration value measurement step 56, the DUT side terminals of the first and the second optical switch 18 and 20 are also connected directly by way of a dummy device as illustrated in FIG. 5, and the first and the second optical switch 18 and 20 are turned to the DUT side.

First, the attenuation factor of the optical attenuator 14 is adjusted (at step S104) to give a desired value of the target input power Pin_target. For adjusting the attenuation factor of the optical attenuator 14, the indication of the first optical power meter $16_1$, that is, the monitor value Pin_monitor is referenced to, and the attenuation factor is controlled to give the monitor value Pin_monitor memorized at step S101 corresponding to the desired value of the target input power Pin_target.

The target input power Pin_target at an in/out point 50 is adjusted to the desired value, a measurement output power Pout_measure, that is, the average indication of the spectrum analyzer 23 is measured (at step S105), and the output calibration value Pout_cal is calculated (at step S106) as Pout_cal=Pout_measure−Pin_target.

Thus, the output calibration value measurement step 46 is performed for every desired value of the target input power Pin_target which is to be inputted to the DUT side input terminal of the optical switch 20.

Figure 4:
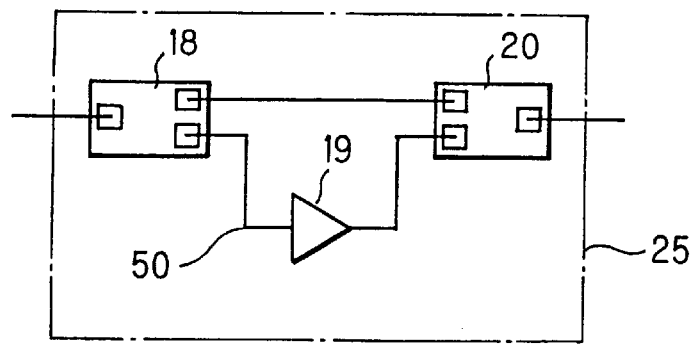
FIG. 4 is a block diagram illustrating the switching means 25 of FIG. 1, wherein an optical amplifier is set between DUT side terminals of the first and the second optical switches 18 and 20 as the device under test 19.

After obtaining the input calibration value Pin_cal and the output calibration value Pout_cal, the optical characteristic measurement (step 47) of the DUT 19, that is, the optical amplifier is performed, connecting the optical amplifier between DUT side terminals of the first and the second optical switch 18 and 20, as illustrated in FIG. 4.

First, an input power value Pin of the signal light to be inputted to the DUT 19 is measured, as follows. Turning the first and the second optical switch 18 and 20 to the direct side, the measurement input power Pin_measure, that is, the average indication of the spectrum analyzer 23 is obtained (at step S107), and a corresponding value of the input calibration value Pin_cal is retrieved. By subtracting the input calibration value Pin_cal from the measurement input power Pin_measure, the input power value Pin is calculated (at step S108), as Pin=Pin_measure−Pin_cal.

Then, the output power value Pout outputted from the DUT 19 is measured in a similar way. Turning the first and the second optical switch 18 and 20 to the DUT side, the measurement output power Pout_measure, that is, the average indication of the spectrum analyzer 23 is obtained (at step S109), and a corresponding value of the output calibration value Pout_cal is retrieved. By subtracting the output calibration value Pout_cal from the measurement output power Pout_measure, the output power value Pout is calculated (at step S110), as Pout=Pout_measure−Pout_cal.

Thus, the input power value Pin to be supplied to the DUT 19 and the output power value Pout outputted from the DUT 19 are exactly measured, by eliminating any effect of losses, including the polarization-dependent loss, of the optical path in the measurement system. From the input power value Pin and the output power value Pout, a precise gain of the DUT 19 is calculated (at step S111) as Pout/Pin.

By performing the optical characteristic measurement step 47 by changing the attenuation factor of the attenuator 14, the gain characteristic of the optical amplifier can be measured precisely and stably in a desired power range, without being affected by polarization-dependent loss.

The input calibration value measuring step 45, the output calibration value measurement step 46 and the optical characteristic measurement step 47 are performed for each of the necessary wavelength bands by controlling ON/OFF the optical switches $11_1$ to $11_8$.

Heretofore, a measurement procedure of the embodiment of FIG. 1 is described in connection with the gain characteristic measurement of an optical amplifier using the optical spectrum analyzer 23. However, the application of the embodiment is not limited to this example. Various characteristics such as noise characteristics, isolation characteristics, spectrum characteristics, or reflection attenuation characteristics of various optical devices such as an optical coupler, an optical isolator, and so on can be measured precisely and stably as well in the same or a similar way.

Further, when detailed measurement results are not necessary, the optical characteristics may be measured making use of the second power meter $16_2$, by applying indications of the second power meter $16_2$ to the measurement input power Pin_measure and the measurement output power Pout_measure in the same way with the indications of the optical spectrum analyzer 23.

Furthermore, the present invention is described in connection with the embodiment of FIG. 1, wherein the DFB-LDs $10_1$ to $10_8$ and the optical coupler 12 are employed for the multi-wave optical source. However tunable wavelength sources (TLSs) may be employed in place of the DFB-LDs $10_1$ to $10_8$ and an arrayed waveguide grating (AWG) may be employed in place of the optical coupler 12, as shown in the block diagram of FIG. 6 illustrating another embodiment of the invention.

Figure 6:
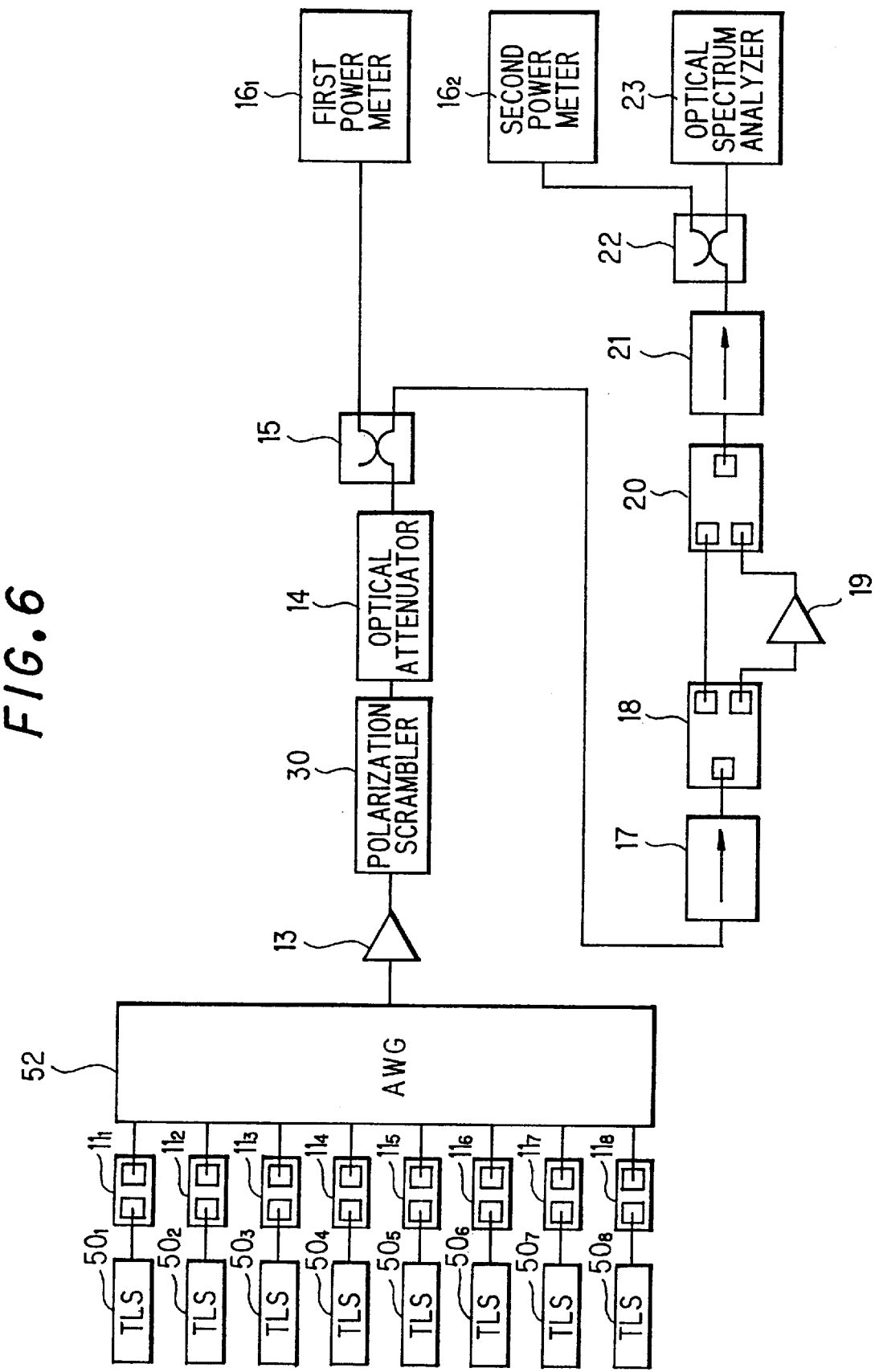
FIG. 6 is a block diagram illustrating a configuration of an optical characteristic measurement system according to another embodiment of the invention.

The optical characteristic measurement system of FIG. 6 has a multi-wave optical source comprising TLSs $50_1$ to $50_8$ each generating a signal light of linear polarization having a wavelength different from each other, optical switches $11_1$ to $11_8$ each provided for switching ON/OFF the output light of a respective one of the TLSs $50_1$ to $50_8$, and an AWG 52 functioning as an optical synthesizer for synthesizing the output lights of the optical switches $11_1$ to $11_8$.

The multi-wave optical source of FIG. 6 generates signal light of linear polarization having one or more desired wavelengths different from each other, by synthesizing a signal light selected by the optical switches $11_1$ to $11_8$ from among the signal light outputted from the TLSs $50_1$ to $50_8$ using the AWG 52, in place of the multi-wave optical source of FIG. 1. The other components of the optical characteristic measurement system of FIG. 6 are the same as the corresponding components of FIG. 1, and duplicate descriptions thereof are herein omitted.

Still further, in the above embodiments, optical sources comprising DFB-LDs or TLSs are employed for generating the signal light showing the linear polarization. However, when the necessary measurement precision is not so strict, certain effects for reducing measurement error due to the polarization-dependent loss can be obtained with a signal light not having a linear polarization.

What is claimed is:

1. An optical characteristic measurement system comprising:
    a multi-wave optical source for generating a signal light of linear polarization having at least one wavelength, each wavelength being different from each other;
    a polarization scrambler for scrambling a polarization direction of the signal light to be supplied to a device under test; and
    an average power measurement means for measuring an average power of the signal light outputted from the device under test, for each of said at least one wavelength.

2. An optical characteristic measurement system as recited in claim 1, wherein a power meter is employed as the average power measurement means.

3. An optical characteristic measurement system as recited in claim 1, wherein the multi-wave optical source generates the signal light of linear polarization having a single wavelength.

4. An optical characteristic measurement system as recited in claim 1, wherein the multi-wave optical source comprises:
    an optical coupler for outputting the signal light by coupling together individual linear polarization signal lights inputted to the optical coupler;
    a plurality of distributed-feedback laser diodes each generating linear polarization light having a wavelength different from each other; and
    optical switches each controlling whether or not to input the linear polarization light generated from a respective one of the distributed-feedback laser diodes into the optical coupler.

5. An optical characteristic measurement system as recited in claim 1, wherein the multi-wave optical source comprises:
    an optical coupler for outputting the signal light by coupling together individual linear polarization signal lights inputted to the optical coupler;
    a plurality of tunable wavelength sources each generating linear polarization light having a wavelength different from each other; and
    optical switches each controlling whether or not to input the linear polarization light generated from a respective one of the tunable wavelength sources into the optical coupler.

6. An optical characteristic measurement system comprising:
    a multi-wave optical source for generating a signal light of linear polarization having at least one wavelength, each wavelength being different from each other;
    a polarization scrambler for scrambling a polarization direction of the signal light;
    an optical attenuator for controlling intensity of the signal light;
    a monitoring means for indicating a monitor value which varies in proportion to a power of the signal light to be supplied to a device under test;
    a switching means for controlling whether the signal light to be supplied to the device under test is outputted and passed through the device under test or outputted directly without passing through the device under test;
    an output power measurement means for obtaining measurement values of a power of the signal light outputted from the switching means for each of said at least one wavelength;
    an average calculation means for calculating an average power by taking a time average of the measurement values obtained by the output power measurement means; and
    a control means for calculating an input calibration value indicating a difference between a power actually supplied to the device under test and the average power to be obtained by measuring a power of the signal light supplied to the device under test, and for calculating an output calibration value indicating a difference between a power actually outputted from the device under test and the average power to be obtained by measuring a power of the signal light outputted from the device under test, by controlling the optical attenuator and the switching means and using the monitoring means and a dummy device to be set in place of the device under test, and by measuring optical characteristics of the device under test from an input power value which is calculated by subtracting the input calibration value from the average value obtained by measuring a power of the signal light supplied to the device under test and an output power value which is calculated by subtracting the output calibration value from the average value obtained by measuring a power of the light signal outputted from the device under test.

7. An optical characteristic measurement system as recited in claim 6, wherein a spectrum analyzer is employed as the output power measurement means.

8. An optical characteristic measurement system as recited in claim 6, wherein the multi-wave optical source generates the signal light of linear polarization having a single wavelength.

9. An optical characteristic measurement system as recited in claim 6, wherein the multi-wave optical source comprises:

an optical coupler for outputting the signal light by coupling together individual linear polarization signal lights inputted to the optical coupler;

a plurality of distributed-feedback laser diodes each generating linear polarization light having a wavelength different from each other; and optical switches each controlling whether or not to input the linear polarization light generated from a respective one of the distributed-feedback laser diodes into the optical coupler.

10. An optical characteristic measurement system as recited in claim 6, wherein the multi-wave optical source comprises:

an optical coupler for outputting the signal light by coupling together individual linear polarization signal lights inputted to the optical coupler;

a plurality of tunable wavelength sources each generating linear polarization light having a wavelength different from each other; and optical switches each controlling whether or not to input the linear polarization light generated from a respective one of the tunable wavelength sources into the optical coupler.

* * * * *